United States Patent [19]

Datta et al.

[11] Patent Number: 5,654,370

[45] Date of Patent: *Aug. 5, 1997

[54] CALENDERED ELASTOMERIC ARTICLES

[75] Inventors: Sudhin Datta, Houston; Periagaram S. Ravishankar, Kingwood; Lawrence George Kaufman, League City, all of Tex.

[73] Assignee: Exxon Chemical Patents Inc., Wilmington, Del.

[ * ] Notice: The term of this patent shall not extend beyond the expiration date of Pat. No. 5,571,868.

[21] Appl. No.: 689,406

[22] Filed: Aug. 8, 1996

Related U.S. Application Data

[62] Division of Ser. No. 490,794, Jun. 15, 1995, Pat. No. 5,571,868.

[51] Int. Cl.$^6$ .......................... C08L 45/00; B32B 27/06; B32B 27/08; B32B 27/32

[52] U.S. Cl. .............. 525/211; 524/1; 524/499; 524/500; 524/502; 524/528; 524/532; 524/534; 524/536; 525/191; 525/210; 525/232; 525/416; 526/282

[58] Field of Search ...................... 525/211, 210, 525/191; 526/282

[56] References Cited

U.S. PATENT DOCUMENTS

| | | |
|---|---|---|
| 3,468,979 | 9/1969 | Harned et al. |
| 3,681,306 | 8/1972 | Wehner. |
| 3,884,993 | 5/1975 | Gros. |
| 4,078,131 | 3/1978 | de Zarauz ............................ 526/20 |
| 4,259,468 | 3/1981 | Kajiura et al. ....................... 526/283 |
| 4,306,041 | 12/1981 | Cozewith et al. .................... 526/65 |
| 4,722,971 | 2/1988 | Datta et al. ......................... 525/211 |
| 4,778,852 | 10/1988 | Futamura ............................ 525/97 |
| 4,843,128 | 6/1989 | Cesare ................................ 525/193 |
| 5,013,901 | 5/1991 | Uehikoshi .......................... 250/202 |
| 5,066,700 | 11/1991 | Braga et al. ........................ 524/380 |
| 5,162,441 | 11/1992 | Nakata et al. ...................... 525/194 |
| 5,239,000 | 8/1993 | Kim et al. .......................... 525/133 |
| 5,242,971 | 9/1993 | Nakahama et al. ................. 524/526 |

FOREIGN PATENT DOCUMENTS

| | | |
|---|---|---|
| 0 201 167 | 11/1986 | European Pat. Off. . |
| 0 446 380 A1 | 9/1991 | European Pat. Off. . |
| 0 446 380 | 9/1991 | European Pat. Off. . |
| 0 564 267 A2 | 10/1993 | European Pat. Off. . |
| 0 564 961 | 10/1993 | European Pat. Off. . |
| 1 208 658 | 10/1970 | United Kingdom . |
| 1 268 570 | 3/1972 | United Kingdom . |
| 1 339 061 | 11/1973 | United Kingdom . |

OTHER PUBLICATIONS

"Correlating Mooney Viscosity to Average Molecular Weight", Journal of Applied Polymer Science, vol. 16, pp. 2677–2684 (1972).

*Primary Examiner*—Fred Zitomer
*Attorney, Agent, or Firm*—Douglas W. Miller

[57] ABSTRACT

Ethylene, alpha-olefin, non-conjugated bicyclic diene elastomeric polymers and/or polymer blends when compounded and formed into a calendered sheet, show surprising improvements for the combination in both green strength and peel adhesion in the unvulcanized state. Such green strength and peel adhesion provide benefits during calendering operations and subsequent joining of calendered sheets, while the compounded elastomeric polymers are in their green or unvulcanized state.

15 Claims, 2 Drawing Sheets

CALENDERED ELASTOMERIC ARTICLES

This is a divisional of U.S. Ser. No. 08/490,794 filed Jun. 15, 1995, now U.S. Pat. No. 5,571,868.

TECHNICAL FIELD

Various embodiments of the present invention generally pertain to the field of calendered elastomeric articles. More particularly various embodiments of the present invention are directed to calendered blends of ethylene, $\alpha$-olefin, non-conjugated diene elastomeric polymers and compounds including these elastomeric polymers. The calendered articles based on these various embodiments of this invention, display superior peel adhesion and green strength in the unvulcanized state. Preferred elastomeric polymers are generally of the ethylene, $\alpha$-olefin, non-conjugated bicyclic diene type.

BACKGROUND

Calendered elastomeric polymer-based compounds find application in many important industrial and commercial articles. Representative of such calendered elastomeric polymer compound articles, are roof sheeting, roof membranes, roof flashing, and, the like. The term compound may have several meanings. For purposes of this specification the term compound shall mean an elastomeric polymer based composition including other ingredients known to those of skill in the art, such as reinforcing fillers, plasticizers, oils, curatives, accelerators, processing aids, and the like.

In the manufacture of calendered articles, compounds of polymers and additives such as reinforcing fillers, extenders, waxes, accelerators, curatives, and the like, can, and often are, premixed in either a continuous mixer or an enclosed mixer such as a Banbury® mixer, and then the compound is placed on a calender for shaping into a useful article. The process of calendering is one which involves relatively little shear. If calender rolls are turning at the same speed the shear will generally be minimal and it will only be the shear created as the compound is forced to move in the space between the calender rolls. If the calendering rolls move at different speeds, then the shear is increased somewhat. The other common method of forming useful articles from elastomeric polymer compounds is extrusion. Extrusion differs generally from calendering in two significant ways; first is that the shear created on the polymer in the article-forming process is substantially higher, often 1 to 2 orders of magnitude higher, than the shear created by calendering; and the second important difference is that the temperature of an extrusion operation is generally higher than the temperature at which a calendering operation is carried out.

Due to the low shear, relatively low temperatures, and very large differences in the forces impinging on the material parallel and perpendicular to the direction of calendering, articles fabricated from a calendering process often can have large directional orientation. Ideally the directional orientation is largely isotropic. These small differences in orientation lead to relatively uniform physical properties measured in both the machine direction (generally the direction in which the elastomeric polymer and the calendering rolls are moving) and the transverse direction (the direction perpendicular to the machine direction). The relative uniformity of orientation leads to a lack of divergence, of many physical properties in one direction compared to the other direction and this is of interest and of high value in applications where directionally divergent physical properties would be detrimental. These application areas include roof sheeting, roofing membranes, roof flashing and the like. An imbalance, or substantial imbalance of physical properties parallel to and perpendicular to the direction of milling would lead to poor failure properties, such as tear resistance. The relative uniformity of physical properties, especially the failure properties, of an elastomeric polymer compound sheet made by a calendering operation, should preferably be substantially similar in all directions, including machine direction and transverse direction, both before and after curing or vulcanization. Typically the failure properties may be measured by a tear test, where the sheet or membrane is ruptured in a specific direction. In an ideal sheet, with substantially isotropic properties, the force needed to tear or rupture the sheet should generally be an invariant function of the direction of operation of the calendering process.

Another property of calendered materials that is valued most in products and applications produced is smoothness of the sheet produced. Smoothness of the calendered sheet generally arises from the ability of the elastomeric polymer compound to flow uniformly under the influence of the shear field of the calendering mill. Thus both smoothness and isotropic properties of the calendered sheet arise from the ability of the polymer compound to flow under the relatively weak shear field of the calendering mills. This ability to flow under the weak shear field is generally most important transverse to the direction of calendering. A polymer compound which exhibits such an ability to flow under such a weak field is termed processable. Processable compounds differ in their ability to respond to shear. More processable polymer compounds generally show isotropic physical properties and smoothness when calendered for shorter times, at lower temperatures, and at lower shear than less processable polymer compounds. Processability may be approximated, for the purpose of certain embodiments of our invention, by the viscosity of the elastomeric polymer compound in the shear zone of the calender. The ideal calendering membrane should be processable before vulcanization in terms of the description above, such that the calendering operation can run at a faster speed.

In calendering operations, the size of a sheet will be dictated by the width of the calender rolls. So, if a width larger than the calender roll width is more convenient or more economical for an end-user, the fabricator is left with several alternatives including gluing or adhesively laminating the strips. However, in roofing sheets such gluing or lamination is generally less effective, less strong, and therefore less acceptable than a process where the sheets are spliced together in their green state. After such a splice the sheet or membrane will have a wider interval between sections which have to be adhesively laminated after vulcanization. Typically, the spliced end products are wide sheets of ethylene, $\alpha$-olefin, non-conjugated bicyclic diene elastomeric polymer compounds. These end product sheets of the membranes will generally be wider than the width of the calendering mills. These wider sheets are made by adhering, in an overlapped splice, the uncured sheets of the elastomeric polymer compound. Generally for this overlap splice to be successful, the adhesion in the uncured or green state of two or more of the calendered sheets is important.

In commercial operations, when splicing is accomplished with green, calendered, elastomeric polymer compounds, the splice is most often made by bringing two calendered sheets of a smooth polymer compound together at a time, and pressing or forcing them together for a short time at ambient temperature. The pressure exerted on polymer sheets during operations of this type are typically less than about 25 pounds per square inch (PSI) (172 KPa) and the time the pressure is exerted is in the range of about 5 seconds. These times and pressures will describe typical manufacturing conditions where the manufacturer is interested in both speed and maintenance of quality.

Another important property for calendered sheets, especially of the uncured or green compound is its tensile strength. This property is of importance to the fabricator or compounder because in the handling of sheets in the manufacturing operation, it is economically and physically impractical to have the sheet supported at all times in all locations. That is, there are usually distances between conveying devices where the uncured sheet is unsupported, and forces such as its own weight can temporarily deform and/or stretch the sheet, the deformation will generally be greater the lower the compound's green strength. Additionally, as the uncured polymer sheet moves over, across, and around various points in a manufacturing operation, the polymer sheet is subjected to elongation or stretching. The ability of a compound to resist such orientation or stretching and maintain its dimensional stability, may improve the final product's general homogeneity of properties in directional physical property tests. Also, such elongation or stretching could alter the thickness of the sheet thereby widening manufacturing tolerances, a generally unacceptable outcome.

The properties of spliced adhesion and green strength or tensile strength in the uncured state are additional constraints in the formation of a smooth sheet with isotropic (physical) properties.

It can be seen that the manufacturer of such a sheet could have competing needs from the green or uncured compound during the calendering and final spliced sheet formation. The competing needs occur because the peel adhesion principally arises from the ability of the macro-molecules in the elastomeric polymer compounds to flow and establish adhesion between two sheets. Generally this requires the diffusion viscosity of the polymer compound to be so low that the flow can be maintained under very gentle shear conditions which may be applied for a short period of time. On the other hand, high values of green strength or tensile strength which are desirable can generally be seen to come from the ability of the polymer compound to resist shear forces without substantial deformation and this implies a rather high viscosity. This inherent need for two seemingly opposing properties of a polymer compound have led to a number of years of substantially unsuccessful attempts to develop ethylene, α-olefin, diene monomer elastomeric polymers which simultaneously have good peel adhesion and good green strength.

There is a commercial need therefore for an elastomeric polymer or an elastomeric polymer compound based on the elastomeric polymer or a combination of elastomeric polymers, that will show a combination of excellent green strength and excellent peel adhesion during a calendering operation.

SUMMARY

We have discovered that calendered articles in general, and particularly roof sheets, roof membranes, and roof flashing made from such calendered articles, where the calendered article utilizes an ethylene, α-olefin, non-conjugated bicyclic diene elastomeric polymer compound, will generally have improved peel adhesion and improved green strength in the unvulcanized (uncured) state.

The ethylene, α-olefin, non-conjugated bicyclic diene elastomeric polymers and elastomeric polymer blends of various embodiments of our invention and calendered sheets, roof sheeting, roof membranes, and roof flashing made from compounds based on these elastomeric polymers or elastomeric polymer blends, show a surprising combination of excellent peel adhesion and excellent green strength in the uncured state, while after curing, retaining or improving end-use physical property requirements placed on such calendered articles. The ethylene, α-olefin, non-conjugated bicyclic diene elastomeric polymers and elastomeric polymer blends, when compounded, will also have the ability to be calendered at generally a faster speed than other ethylene, α-olefin, non-conjugated bicyclic diene elastomeric polymer compounds known in the art, while still achieving a desirable smooth surface.

A calendered article including, but not limited to, roof sheeting, roof membranes, and roof flashing will generally comprise an elastomeric polymer or a blend of elastomeric polymers, the blend may include a first ethylene, α-olefin, non-conjugated bicyclic diene elastomeric polymer. This first elastomeric polymer will be present in the calendered article at a ratio of 1.5:1 to 9:1 with a second elastomeric polymer. This first elastomeric polymer will have a non-conjugated bicyclic diene content in the range of from about 0.1 to about 10 weight percent This first elastomeric polymer has an ethylene content such that the elastomeric polymer can be described as essentially non-crystalline, as measured by a Differential Scanning Calorimeter (DSC) as described below. Typically the crystallinity of this first elastomeric polymer is less than about 2.5 percent crystallinity, preferably less than about 1.5 percent crystallinity, more preferably less than about 1 percent crystallinity. When the alpha-olefin is propylene, this condition is satisfied when the ethylene content is in the range of from about 10 to about 63 weight percent. When other alpha-olefins are used, slightly different mounts of ethylene can be introduced without violating the above limitation of crystallinity. Thus, if the α-olefin is for instance octene-1 the ethylene content of the polymer may be as high as 65 weight percent or slightly higher without departing from the desired crystallinity.

The second elastomeric polymer has an ethylene content high enough to be semi-crystalline. Typically the crystallinity of this polymer is greater than about 3 percent crystallinity, preferably greater than about 5 percent crystallinity. When the alpha-olefin is propylene, the second elastomeric polymer may have ethylene present in the range of from about 65 to about 85 weight percent and the non-conjugated bicyclic diene will be present in the range of from about 0.1 to about 10 weight percent said weight percents based on the total weight of the second elastomeric polymer. When the alpha-olefin is not propylene and is for instance octene-1 or hexene-1, slightly different limitations of the mount of crystallinity and the non-conjugated bicyclic diene content will apply.

The first elastomeric polymer will have a viscosity described by Mooney viscosity [ML (1+4)] at 125° C. in the range of from about 6 to about 150. The second elastomeric polymer will have a viscosity described by ML (1+4) 125° C. in the range of from about 100 to about 1,000.

About 93% or greater of the molecules of each elastomeric polymer will have an ethylene content within about 2% of the average ethylene content of the respective elastomeric polymer. Similarly, about 93% or greater of the molecules of each elastomeric polymer will have a non-conjugated bicyclic diene content within about 0.25% of the non-conjugated bicyclic diene content of the respective elastomeric polymer. Additionally, although the polydispersity ($M_w/M_n$), as measured by Gel Permeation Chromatography (GPC), of each elastomeric polymer is less than about 2.5, the blend will have a polydispersity ($M_w/M_n$) as measured by GPC, larger than about 2.0, but less than about 3.5.

BRIEF DESCRIPTION OF THE DRAWINGS

These and other features, aspects, and advantages of the present invention will become better understood with reference to the following description, appended claims, and accompanying drawings where:

DESCRIPTION

Introduction

Figure 1:
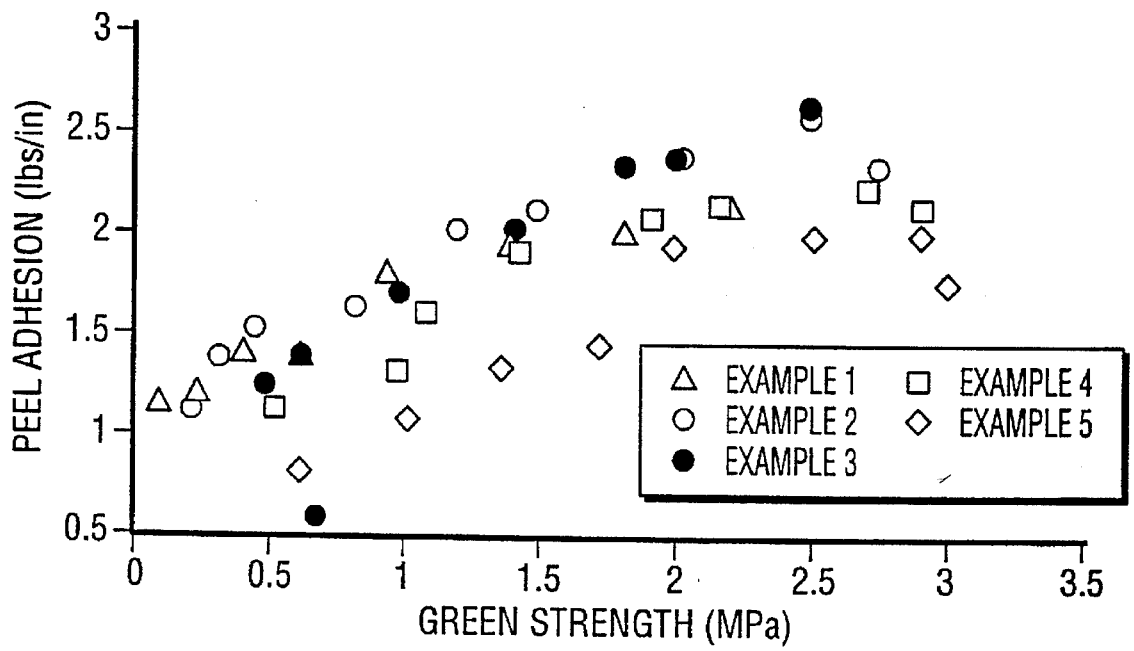
FIG. 1 shows a comparison of Examples 1 to 5, plotting peel adhesion in lb./in. versus green strength (MPa).
Figure 2:
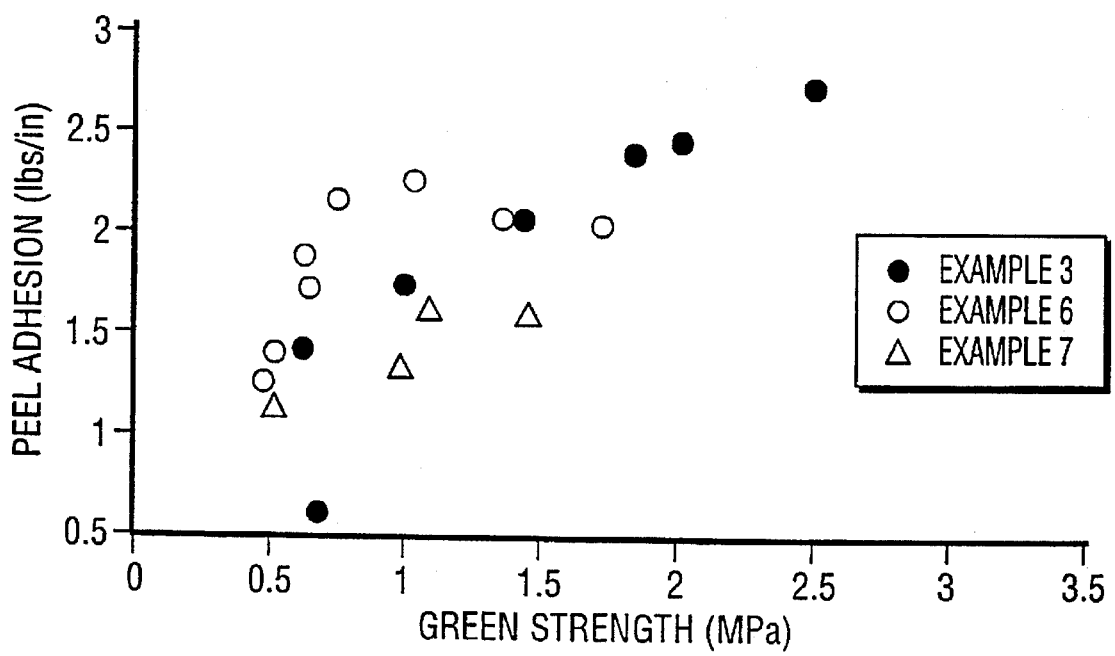
FIG. 2 is a comparison of Examples 3, 6, and 7, plotting peel adhesion in lb./in. versus green strength (MPa).
Figure 3:
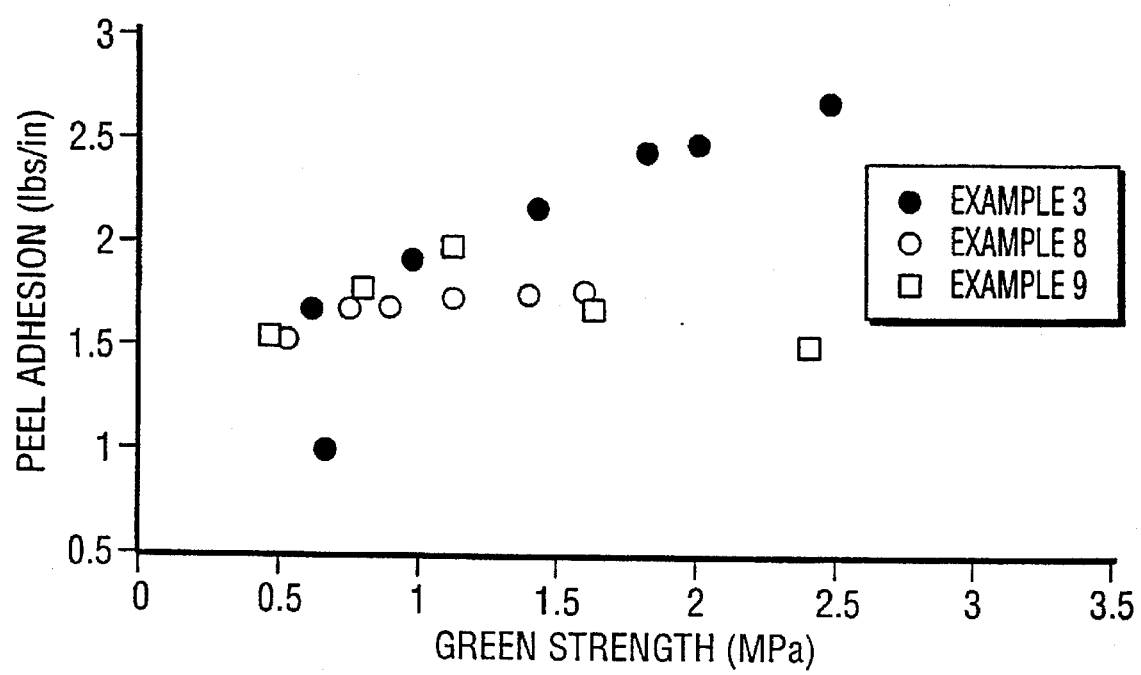
FIG. 3 shows a comparison of Examples 3, 8, and 9, plotting peel adhesion in lb./in. versus green strength (MPa).
Figure 4:
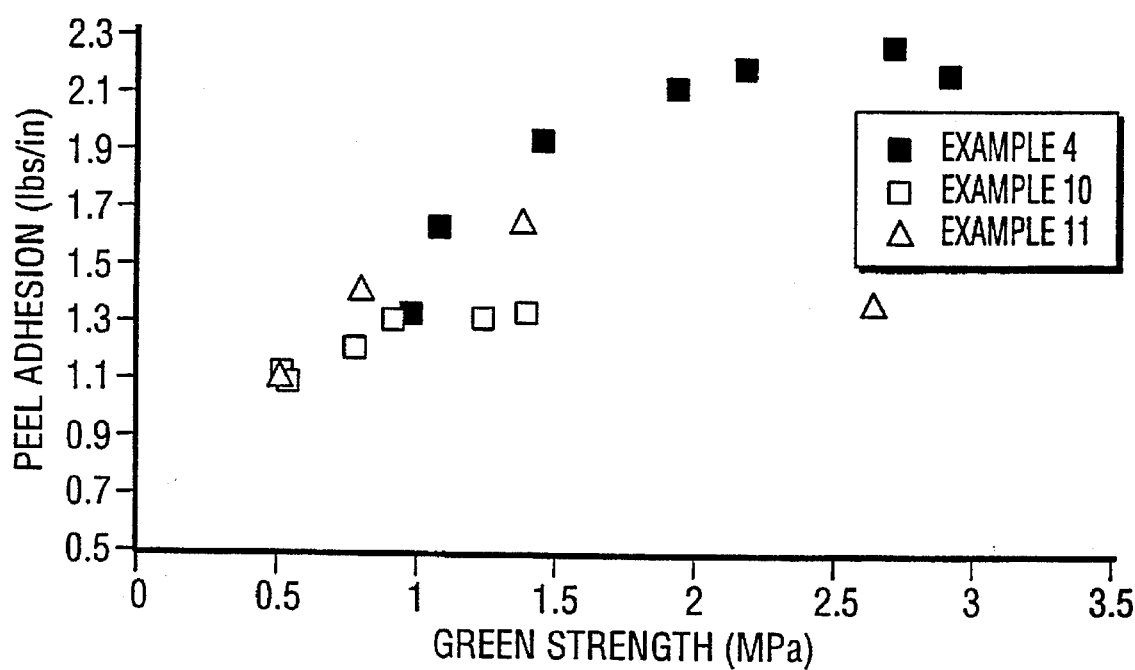
FIG. 4 shows a comparison of Examples 4, 10, and 11, plotting peel adhesion in lb./in. versus green strength (MPa).

Various embodiments of the present invention concern certain classes of fabricated ethylene, α-olefin, non-conjugated bicyclic diene elastomeric polymers or elastomeric polymer blends, compounds made from the elastomeric polymers, elastomeric polymer blends, articles made from these compounds, and their uses. These articles have a unique blend of ethylene, α-olefin, non-conjugated bicyclic diene elastomeric polymers having unique characteristics which make them particularly well suited for use in certain applications. Calendered sheets made from elastomeric polymer compounds generally should have directionally isotropic physical properties, such as for instance, tear resistance. During a calendering operation elastomeric polymers, blends thereof, and compounds based on such polymers and/or blends will display generally good processability as defined by improved calendering speed while still producing a smooth sheet, good peel adhesion, and good green strength in the unvulcanized state. A detailed description of certain preferred elastomeric polymers, elastomeric polymer blends, and compounds made therefrom for use in fabricating calendered goods such as roof sheeting, roof membranes, and roof flashing, that are within the scope of our invention, preferred methods of producing the elastomeric polymers and elastomeric polymer blends and the preferred applications of the calendered parts follow. Those skilled in the art will appreciate that numerous modifications to these preferred embodiments can be made without departing from the scope of our invention. For example, while the properties of calendered goods used in roofing applications are used to exemplify the attributes of certain elastomeric polymers and elastomeric polymer blends of the present invention, the elastomeric polymers and elastomeric polymer blends have numerous other uses. To the extent that our description is specific, this is solely for the purpose of illustrating a preferred embodiment, and should not be taken as limiting our invention to these specific embodiments.

The use of sub-headings in the description is intended to assist the reader, and is not intended to limit the scope of our invention in any way.

After curing or vulcanization, calendered articles included in various embodiments of our invention will also have excellent weatherability, excellent thermal resistance, excellent solvent resistance, good tear resistance, tensile strength and elongation. The calendered mires can be further joined, as in a roof installation, by adhesives well known to those of ordinary skill in the art. Curing or vulcanization can take place by the action of heat and time either at elevated temperatures or at ambient conditions; again the curing mechanisms will be well known to those of ordinary skill in the art. Other methods of curing include, but are not limited to electron beam radiation.

| Definitions and Test Methods Used in the Specification | | |
|---|---|---|
| Test | Units | Test Method |
| Mooney Viscosity ML (1 + 4) at 125° C. | Mooney Units | ASTM D1646 |
| Ethylene | weight % | ASTM D3900 |
| 5-Ethylidene-2Norbornene | weight % | FT-IR* |
| Peel Adhesion | lb./in (kg/m) | Test method described herein |
| Green Strength Tensile, Ultimate | PSI (MPa) | ASTM D412 |
| Molecular Weight Distribution $M_w/M_n$ | | (1) |
| Composition Distribution | None | (2) |
| Differential Scanning Calorimetry | percent | (3) |

*Fourier Transform - Infra Red
(1) Techniques for determining the molecular weight distribution are found in U.S. Pat. No. 4,540,753 (Cozewith, Ju and Verstrate) and references cited therein and in Macromolecules 1988, volume 21, p 3360 (Verstrate et al) and references cited therein, incorporated herein by reference for purposes of U.S. Pat. practice.
(2) Compositional distribution can be described as follows. About 5.0 g the polymer is dissolved with agitation in 250 ml of hexane at room temperature. To this solution is added 2-propanol dropwise until the solution becomes turbid. Approximately one more mL of 2-propanol is added and the solution is allowed to stand for 5 minutes. The entire solution is filtered through a 400 mesh stainless steel screen and the residue is separated and dried. This residue should be approximately 0.1 g. The residue is spectroscopically analyzed by infra red for composition (ethylene and diene) and compared to the composition of the bulk sample.
(3). The Differential Scanning Calorimetry is described as follows. About 6 to 10 mg of a sheet of the polymer pressed at approximately 150° C. to 200° C. is removed with a punch die. This is annealed at room temperature for 45 to 60 hours. At the end of this period the sample is placed in a Differential Scanning Calorimeter (Perkin Elmer 7 Series Thermal Analysis System) and cooled to −70° C. to −100° C. The sample is heated at 20° C./min to attain a final temperature of 150° C. to 180° C. The thermal output is recorded and the area under the melting peak of the sample which is typically peaked at 30° to 50° C. and occurs between temperatures of 0° C. and 90° C. is measured in Joules. This is divided by the weight of the sample to produce the latent heat of melting in joules per gram. This was divided by 2.79 to produce the percent crystallinity of the sample.

The Elastomeric Polymer Components

The elastomeric polymer will generally comprise an elastomeric polymer or a blend of elastomeric polymers. This blend may be made by adding two or more elastomeric polymer components together during the compounding operation with the additives shown earlier. Alternatively, the elastomeric polymers may be blended together during polymerization by making each of the individual components in a polymerization reactor or reactors followed by recovery of a blended polymer. Such polymerization procedures may involve the use of multiple reaction vessels, in series, in parallel, or other configurations known to those of ordinary skill in the art.

The blend will include a first ethylene, α-olefin, non-conjugated bicyclic diene elastomeric polymer. This first elastomeric polymer will be present in the calendered article at a ratio of 1.5:1 to 9:1 with a second elastomeric polymer.

This first elastomeric polymer will have a non-conjugated bicyclic diene content in the range of from about 0.1 to about 10 weight percent, preferably in the range of from about 0.5 to about 8 weight percent, more preferably in the range of from about 1 to about 5 weight percent, most preferably in the range from about 2 to about 5 weight percent of a bicyclic non-conjugated diene. Typically the crystallinity of this first elastomeric polymer is less than about 2.5 percent crystallinity, preferably less than about 1.5 percent crystallinity, more preferably less than about 1 percent crystallinity. When the alpha-olefin is propylene, this crystallinity condition is satisfied when the ethylene content is in the range of from about 10 to about 63 weight percent, preferably in the range of 45 to 62 weight percent and most preferably in the range of 50 to 60 weight percent. When other α-olefins are used, slightly different amounts of ethylene can be introduced without departing from the above disclosed crystallinity. Thus if the α-olefin is 1-octene for instance, the ethylene content of the polymer may be as high as 65 percent by weight or slightly higher without violating the requirement of the limit on the crystallinty. The non-conjugated bicyclic diene is selected from the group consisting of 5-ethylidene-2-norbornene, dicyclopentadiene, vinyl norbornene, and combinations thereof. The preferred non-conjugated bicyclic diene is 5-ethylidene-2-norbornene. The first elastomeric polymer will have Mooney viscosity (ML 1+4 at 125° C.) in the range of from about 20 to about 150 preferably between about 25 and about 125, and more preferably between about 25 and about 70.

The second elastomeric polymer, generally an ethylene, alpha-olefin, non-conjugated bicyclic diene elastomeric polymer, is somewhat higher in viscosity than the first elastomeric polymer, and can be described generally as a semi-crystalline elastomeric polymer, attributable usually to having a higher ethylene content than the first elastomeric polymer component. The ethylene content of the second elastomeric polymer component will be in the range of from about 65 to about 85 weight percent, preferably in the range of from about 70 to about 80 weight percent, more preferably in the range of from about 73 to about 77 weight percent, most preferably in the range from about 72 to about 75 weight percent. Said weight percents based on the total weight of said second elastomeric polymer. Typically the crystallinity of this elastomeric polymer is greater than about 3 percent, preferably greater than about 5 percent. The non-conjugated bicyclic diene is selected from the group consisting of 5-ethylidene-2-norbornene, dicyclopentadiene, vinyl norbornene and combinations thereof. The preferred diene is 5-ethylidene-2-norbornene. The non-conjugated bicyclic diene will be present in the second elastomeric polymer in the range of from about 0.1 to about 10 weight percent preferably in the range of from about 0.5 to 8 weight percent more preferably in the range of from about 2 to about 5 weight percent. The use of 1,4-hexadiene as the diene, or one of the dienes in either or both of the first and second elastomeric polymer is also contemplated.

For the composition of the first and second elastomeric polymers of the blend, the mole fractions of the constituent monomers are determined according to the formula described below for generally any elastomeric polymer.

$W_E$ is the weight percent of ethylene; $W_A(n)$ is the weight percent of the alpha-olefin, "n" selected from the list of alpha-olefins described above.

$W_A$ (propylene) is the weight percent of propylene.
$W_A$ (butene) is the weight percent of 1-butene.
$W_A$ (hexene) is the weight percent of 1-hexene.
$W_A$ (octene) is the weight percent of 1-octene.
and similarly for
$W_A$ (decene), $W_A$ (4-methyl-1-pentene)
$W_D(n)$ is the weight percent of the non-conjugated bicyclic diene selected from the list above, thus $W_D$ (5-ethylidene-2-norbornene) is the weight percent of 5-ethylidene-2-norbornene, similarily for $W_D$ (5-vinyl-2-norbornene) is the weight percent for each of the constituent monomers of the component polymers.

$M_X$ is the molecular weight of the constituent monomers, thus $M_E$ is the molecular weight of ethylene;
$M_A(n)$ is the molecular weight of the alpha-olefin "n" selected from the list above;
$M_D(n)$ is the molecular weight of the non-conjugated diene selected from the list above.

Using this formalism for either the first or second elastomeric polymer the moles of ethylene per unit weight of polymer is ($X_E$), $$X_E = \frac{W_E}{100 \times M_E}$$

The moles of alpha-olefin per unit weight of polymer of all alpha-olefin ($X_A$) is $$X_A = \frac{1}{100} \times \left( \sum_n \frac{WA(n)}{MA(n)} \right).$$

Where the sum (n) is for all types of alpha-olefin of the moles of alpha-olefin per unit weight of polymers of all diene $X_D$ is $$X_D = \frac{1}{100} \times \left( \sum_n \frac{WD(n)}{MA(n)} \right).$$

Where the sum (n) is for all types of non-conjugated bicyclic dienes. Using this formalism the mole fraction of ethylene in the polymer $Y_E$ is $$Y_E = \frac{X_E}{X_E + X_A + X_D}.$$

The total mole fraction of alpha-olefin is $Y_A$ $$Y_A = \frac{X_A}{X_E + X_A + X_D}.$$

The mole fraction in diene is $Y_D$ $$Y_D = \frac{X_D}{X_E + X_A + X_D}.$$

The viscosity of the second elastomeric polymer can be described by a Mooney viscosity specifically ML at 125° C. (1+4) in the range of from about 100 to about 1,000, preferably in the range of from about 150 to about 800, and more preferably in the range of from about 200 to 700. This Mooney viscosity, in the values greater than about 100, cannot generally be directly measured. These Mooney viscosities are obtained using the relationship shown in Equation 1 below.

$$\text{Log } ML = n_A \log ML_A + n_B \log ML_B \quad \text{(Equation 1)}$$

Where all logarithms are to the base 10. ML is the Mooney viscosity of a blend of two polymers A, & B each having individual Mooney viscosities $ML_A$ and $ML_B$, respectively. The fraction of polymer A in the blend is $n_A$, while the fraction of the polymer B is $n_B$.

Using Equation (1) and blends of a high ML polymer (A) with a lower ML polymer 011), it is possible to have blends which have a measurable Mooney viscosity, ML and then calculate the desired $ML_A$.

The alpha-olefins in both the first and second elastomeric polymers will be generally made up of 1 or more α-olefins selected from the group consisting of propylene, butene-1, 4-methyl-1-pentene, hexene-1, octene-1, decene-1, combinations thereof and the like. Propylene, hexene-1, and octene-1 are the preferred α-olefins. Most preferred is propylene. Addition of a mixture of one or more of these α-olefins in the first and/or second elastomeric polymers is also contemplated. The alpha-olefins of said first and said second elastomeric polymers may be present in the same or different amounts providing the limitations of the crystallinity and the Mooney viscosity indicated above are satisfied. The alpha-olefin or alpha-olefins in said first or said second elastomeric polymers may be the same or different and may be present in said first and/or second elastomeric polymers at the same or different levels.

The bicyclic non-conjugated diene in the first or second elastomeric polymer may be the same or different, and may be present in both at the same or different levels.

Additional polymers and/or elastomeric polymers may be included in a blend and their use is contemplated and not foreclosed by the present disclosure. Such polymers or elastomeric polymers might include, but are not limited to styrene-butadiene rubber, natural rubber, ethylene-propylene rubber, butadiene rubber, neutralized sulfonated ethylene, α-olefin, non-conjugated diene elastomeric polymer, halogenated butyl rubber and neutralized sulfonated butyl rubber.

The Elastomeric Polymer Blend

The elastomeric polymer or elastomeric polymer blend which forms a basis for the calenderable compounds, will include the first elastomeric polymer or polymer segment present in the blend in the range of from about 90 to about 60 weight percent of the polymer blend. Or described alternatively, the first elastomeric polymer will be present in a ratio to a second elastomeric polymer or polymer blend in the range of from about 1.5:1 to about 9:1, preferably the first elastomeric polymer is present in the blend in the range of from about 70 to about 85 percent (3.3:1 to 6:1), more preferably in the range of from about 70 to about 80 percent (3.3:1 to 4:1), said percents based on the weights of the first and second elastomeric polymers.

The elastomeric polymer blend may be made by adding the first and second elastomeric polymers (made separately). Alternatively, in another embodiment of our invention, the elastomeric polymer blend may be made by blending the first and second elastomeric polymers in solution and generally removing the blend as a single polymer. This single polymer blend has predetermined mounts of the first and second elastomeric polymers and may be made by independent polymerization of the first and second elastomeric polymeric components. Such individual polymerization may be conducted in series or parallel polymerization reactors or in a single polymerization reactor with at least two different polymerization catalysts. Procedures for the recovery of such a predetermined blend are described in the references contained in U.S. Pat. No. 4,722,971 which are incorporated herein by reference for the purpose of U.S. Patent practice. The disclosure includes traditional Ziegler-Natta Catalyst Systems, however we also contemplate the use of Metallocene catalyst systems.

In an elastomeric polymer blend it is generally not possible to determine the individual parameters of individual members of the polymer blend. However, in such cases the composition, molecular weight, and the blend ratio of the individual elastomeric polymers used may be determined for the unvulcanized polymer or unvulcanized polymer compound by dissolution of the polymer in a suitable solvent, followed by differential precipitation. The separation of the elastomeric polymer components depends upon the differences in the solubility of the ethylene, α-olefin, non-conjugated bicyclic diene elastomeric polymer components of the polymer blend due to differences in molecular weight and composition.

The narrowness of the compositional distribution means that generally about 93 percent of the molecules of each elastomeric polymer will have a composition within about 2 percent of the ethylene content of the bulk elastomeric polymer of that respective elastomeric polymer. Additionally, about 93 percent of the molecules of each elastomeric polymer will have a composition within about 0.25 percent of the bicyclic, non-conjugated diene content of the bulk elastomeric polymer of the respective elastomeric polymers. Preferably about 95 percent of the molecules of each elastomeric polymer will have a composition within about 1.5 percent of the ethylene, and 0.2 percent of the bicyclic non-conjugated diene content of the bulk elastomeric polymer of that respective elastomeric polymer. More preferably about 97 percent of the molecules of each elastomeric polymer will have a composition within about 1 percent of the ethylene content of the bulk elastomeric polymer of that respective elastomeric polymer. Additionally, about 97 percent of the molecules of each elastomeric polymer will have a composition within about 0.1 percent of the bicyclic, non-conjugated diene content of the bulk elastomeric polymer of that respective elastomeric polymer.

The components of a polymer blend of two such elastomeric polymers will be narrow in compositional distribution and narrow in molecular weight distribution. ($M_{w, GPC, LALLS}/M_{n\ GPC,DRI}$) (hereinafter $M_w/M_n$). The narrow distribution as described by $M_w/M_n$ of each of the elastomeric polymers means that as measured by Gel Permeation Chromatography (GPC) $M_w/M_n$ is generally less than about 3.5, preferably less than about 3.0, and more preferably less than about 2.5. Techniques for determining the molecular weight distribution are found in U.S. Pat. No. 4,540,753 and references cited therein, incorporated herein by reference for purposes of U.S. patent practice.

Roofing Sheeting Compound Ingredients In addition to the elastomeric polymer or elastomeric polymer blend containing the above-referenced elastomeric polymers and optionally other elastomeric polymers, roof sheeting compounds may contain various elastomeric polymer compounding and vulcanizing components well known to those of ordinary skill in the art. These compounds may include fillers, processing or softening oils, anti-oxidants, anti-ozonants, ultraviolet light stabilizers or absorbers, vulcanizing or curative agents, vulcanizing or curative accelerators, cure retarders, processing aids, flame retardants, tackifying resins, and the like.

Fillers and/or reinforcing materials which are often used include carbon black, clay, talc, calcium carbonate, mica, silica, silicate, combinations thereof, and the like. The roofing compound may include in the range of from about 10 to about 400, preferably in the range of from about 30 to 250 parts by weight per hundred parts of rubber or elastomeric polymer or elastomeric polymer blend (hereinafter phr) of such fillers or filler mixtures.

Curing or vulcanizing agents which may be utilized include sulfur and certain sulfur donor compounds well known to those of ordinary skill in the art. Mixtures of these sulfur compounds may also be advantageously used. Sulfur donor compounds which may be employed in the compounds in the elastomeric polymer roofing compounds include thiuram poly-sulfide, exemplified by tetramethylthiuram disulfide, diisopropyl-tetramethylthiuram disulfide, tetrabutylthiuram disultide, dipentylmethylene-thiuram tetrasulfide, dipentylmethylenethiuram hexasulfide, dicyclohexamethylene-thiuram disulfide, phenylethylthiuram disulfide. Additionally, dialkyl-dithiocarbamates such as zinc, dibutyl-dithiocarbamates, zinc dimethyl-dithiocarbamates, zinc diethyl-dithiocarbamates, bismuth dimethyl-dithiocarbamates, nickel dibutyl-dithiocarbamates, copper dimethyl-dithiocarbamates, selenium diethyl-dithiocarbamates, lead dimethyl-dithiocarbamates, tellurium dimethyl-dithio-carbamates, tellurium diethyl-dithiocarbamates, cadmium diethyl-dithiocarbamates, and the like.

In addition to the above-referenced curing or vulcanizing agents, vulcanizing accelerators which may be employed include thiourea such as ethylene thiourea, N,N'-dibutyl-thiourea, N,N'-diethyl-thiourea, and the like, thiourea-mono-sulfides such as tetra-methyl-thiourea-mono-sulfide, tetra-ethyl-thiourea-mono-sulfide, tetra-butyl-thiourea-mono-sulfide, and the like, benzothiazole-sulfonamides such as N-oxy-diethylene-benzothiazole-2-sulfonamide, N-cyclo-hexobenzothiazole-2-sulfonamide, N,N'-diisopropyl-benzothiazole-2-sulfonamide, N-tert-butyl-benzothiazole-2-sulfonamide, and the like; 2-mercaptoimidazoline, N-diphenyl-guanidine, N,N'-di(2-methyl-phenyl)guanidine, 2-mercapto-benzothiazole, 2-(morpholinodithio) benzothiazole-disulfide, and zinc 2-mercapto-benzothiazole, and the like.

Levels of such sulfur/sulfur donor compounds or mixtures of these compounds for use in elastomeric polymer based roof sheeting compounds, may range from about 0.5 to about 6 phr, preferably 1 to 4 phr, based on the total weight of the total elastomeric polymer compound weight. For purposes of this application, the term phr will mean parts per hundred rubber or parts per hundred elastomeric polymer.

Formulation Parameters

In the examples which follow, the composition of the elastomeric polymer compounds were made according to the following recipe:

| Ingredient | Amount in Compound |
| --- | --- |
| Polymer A[1] | X parts |
| Polymer B[1] | 100 - X parts |
| Carbon Black N650 | 138.5[2] |
| Process Oil Sunpar ® 2280 (available from Sun Oil Co.) | 95[2] |
| Zinc Oxide | 2.5[2] |
| Stearic Acid | 1 |
| Sulfur | 0.9[2] |
| hindered sulfur compound[3] | 0.9[2] |
| Santocure ® NS available from Monsanto Co. | 2.5[2] |

[1]A + B = 100
[2]Parts per hundred parts (A + B)
[3]combination of hindered sulfur compounds selected from the list above A typical roof sheeting calendering process involves a) mixing, b) calendering, c) curing or vulcanizing. A general description of these steps follows:

a) Mixing

A two pass upside down mix in a Banbury mixer is employed. First all the zinc oxide plus carbon black and fillers are added at a rotor speed of about 50 rpm. Oil is added on top and then elastomeric polymer or polymers are added. This combination is mixed for about 1.5–2 min. and dumped with the polymer at 300°–340° F. (148°–171° C.). In the second pass, the mixture is put into the Banbury® with the master batch from the first pass and the stoichiometric amount of curing agents are added. Then this mixture is further mixed for 1.5–2.0 min. @ 40–50 rpm and dumped at 200°–230° F. (93°–110° C.).

b) Calendering

The stock from the 2 pass mix is conveyed to the roll mills and then the calenders at –210°–250° F. (98°–121° C.). The sheets then pass through chill rolls at 40°–60° F. (5°–15° C.) and then pass through a mica dusting area and then wound up on a mandrel.

c) Curing

The mandrel holding the roof sheeting membrane is placed in a steam autoclave and cured for 4–6 hours at 302° F.–392° F. (150°–200° C.). Other curing techniques may be used, such as rotocuring, dry air oven aging and the like.

EXAMPLES

In all of the examples, the elastomeric polymer blend and the other recipe ingredients are combined in a Banbury® mixer.

Peel adhesion testing is performed as follows: the compound is banded and adjusted on a two-roll mill at a roll temperature to 82° C.–95° C. to a thickness of 1.25 cm to 1.30 cm. When the stock or compound is smooth and free of bubbles, o it is removed from the roll. The compound is laid roll-side down on Mylar® sheet or film. The sample is brought to a constant temperature of between 70° F. to 77° F. (21° to 25° C.) and 50 percent plus or minus 5 percent relative humidity. The compound is allowed to rest at these temperatures for a minimum of 1 hour before die cutting to dimensions of 2.5 cm by 15.25 cm by 1.27 cm. On an Instron®, the jaw separation is adjusted to about 1.9 cm and the cross-head speed is set to 1.27 meters per minute. The instrument is adjusted to zero and then calibrated on range to full scale reading. The die cut samples are plied two at a time each having the dimensions 53 cm×15.2 cm×1.27 cm together with a piece of Mylar® inserted between the plies to create a tab. The sample is rolled six times with a 2.2 kg roller and the sample is put into the jaws of the Instron instrument. The low, high, and weighted average of the adhesion values are noted. The adhesion value reported in Tables I–XII are the high reading of each test.

Green strength was measured by die cutting out ASTM tensile strength dumb-bells from a sheet of polymer 50 (0.127)±5/1,000 inches (0.0127 cm) thick which had been annealed at 23°±2° C. and 50±5 percent relative humidity for 2 hours. The dumb-bells are then heated in an oven at 180° F. (82° C.) for 2 minutes, and then put into a –40° F. (–40° C.) freezer between chilled aluminum plates so that the temperature of the dumb-bells would reach 47° F. (8.3° C.). Observations indicated that this temperature was generally reached in about 15 seconds. The samples are tested 1 minute after this thermal treatment to let the temperature equilibrate on an Instron instrument at a cross-head speed of 20 inches (50.8 cm) per minute. The peak tensile strength is recorded and the average value of 3 measurements is recorded in MPa.

In each of the examples each of the polymer A(n) group and polymer B(n) group (where n=1 to 5) are blended with the compounding ingredients shown in the above formulation. Polymers A(n) and B(n) are described in the table below:

TABLE I

Elastomeric Polymer

| Designation | Ethylene | weight percent (1) | ML |
|---|---|---|---|
| $A_1$ | 57.0 | 3.2 | 20 |
| $A_2$ | 60.2 | 2.9 | 32 |
| $A_3$ | 60.3 | 2.8 | 41 |
| $A_4$ | 59.4 | 2.6 | 51 |
| $A_5$ | 60.5 | 3.2 | 67 |
| $B_1$ | 74 | 2.5 | 72 |
| $B_2$ | 76 | 2.9 | 247 |
| $B_3^2$ | 78 ± 4 | 2.9 ± 0.6 | 1900 ± 700 |
| $B_4$ | 68 | 2.5 | 189 |
| $B_5$ | 84 | 2.6 | 291 |

(1) 5-ethylidene-2-norbornene
[2] a combination of polymers

EXAMPLE 1

In this example polymer B2 is blended with polymer A1 where the amount of polymer A1 is described in the first column, Table 2.

EXAMPLE 2

In this example polymer B2 is blended with polymer A2 according to Table 3.

EXAMPLE 3

Polymer B2 is blended with polymer A3 as shown in Table 4.

EXAMPLE 4

Polymer B2 is blended with polymer A4 as shown in Table 5.

EXAMPLE 5

Polymer B2 is blended with polymer A5 as shown in Table 6. The data in Examples 1 to 5 indicate that the higher viscosity of the A component leads generally to monatomic increases in green strength. The combination of the results indicate that the blends or B2 with A3 (Example 3) and B2 with A4 (Example 4) have the best combination of peel adhesion and green strength as seen in FIG. 1.

EXAMPLE 6

In this example the effect of addition of a highly crystalline polymer when polymer A3 is blended with polymer B1 shown in Table 7.

EXAMPLE 7

The effect of addition of a highly crystalline polymer, which is shown by polymer B3 blended with polymer A3 as shown in Table 8.

Comparison of the data in Examples 3, 6, and 7 show that increasing the Mooney viscosity or ML of the B component raises the green strength monotonically. As can be seen, the best combination of green strength and peel adhesion is from Example 3, blending polymer B2 with A2.

EXAMPLE 8

Polymer A3 was blended with polymer B4 as shown in Table 9.

EXAMPLE 9

Polymer B5 was blended with polymer A3 as shown in Table 10. Comparison of the data in Examples 3, 8, and 9 indicate that increasing the ethylene content of the B polymer leads again to a monatomic increase in the green strength, however, the blends of Example 3, that is polymer B2 with A3 show the best combination of green strength and peel adhesion as seen in Table 3.

Although the present invention has been described in considerable detail with reference to certain preferred versions thereof, other versions are possible. For example, other compounding methods and formulations are contemplated, as well as other methods of achieving the unique combination of properties of the elastomeric polymers. Therefore the spirit and scope of the appended claims should not be limited to the description of the preferred versions contained therein.

TABLE II

| X | Peel Adhesion lb./in. | Green Strength MPa |
|---|---|---|
| 65 | 2.12 | 2.19 |
| 70 | 2.00 | 1.82 |
| 75 | 1.94 | 1.39 |
| 80 | 1.80 | 0.94 |
| 85 | 1.39 | 0.61 |
| 90 | 1.41 | 0.40 |
| 95 | 1.21 | 0.23 |
| 100 | 1.16 | 0.11 |

X represents the weight precent of the $A_n$ component that makes up the $A_n + B_n$ combination.

TABLE III

| X | Peel Adhesion lb./in. | Green Strength MPa |
|---|---|---|
| 65 | 2.57 | 2.47 |
| 70 | 2.37 | 2.02 |
| 75 | 2.09 | 1.49 |
| 80 | 2.00 | 1.19 |
| 85 | 1.63 | 0.82 |
| 90 | 1.52 | 0.43 |
| 95 | 1.37 | 0.32 |
| 100 | 1.12 | 0.21 |

X represents the weight precent of the $A_n$ component that makes up the $A_n + B_n$ combination.

TABLE IV

| X | Peel Adhesion lb./in. | Green Strength MPa |
|---|---|---|
| 65 | 2.32 | 2.73 |
| 70 | 2.62 | 2.47 |
| 75 | 2.37 | 2.00 |
| 80 | 2.32 | 1.82 |
| 85 | 2.01 | 1.41 |
| 90 | 1.70 | 0.97 |
| 95 | 1.39 | 0.61 |
| 100 | 1.24 | 0.48 |

X represents the weight precent of the $A_n$ component that makes up the $A_n + B_n$ combination.

TABLE V

| X | Peel Adhesion lb./in. | Green Strength MPa |
|---|---|---|
| 65 | 2.10 | 2.89 |
| 70 | 2.21 | 2.69 |
| 75 | 2.13 | 2.17 |
| 80 | 2.06 | 1.92 |
| 85 | 1.89 | 1.43 |
| 90 | 1.60 | 1.07 |
| 95 | 1.31 | 0.97 |
| 100 | 1.12 | 0.51 |

X represents the weight precent of the $A_n$ component that makes up the $A_n + B_n$ combination.

TABLE VI

| X | Peel Adhesion lb./in. | Green Strength MPa |
|---|---|---|
| 65 | 1.73 | 2.99 |
| 70 | 1.97 | 2.89 |
| 75 | 1.96 | 2.49 |
| 80 | 1.92 | 2.00 |
| 85 | 1.43 | 1.73 |
| 90 | 1.32 | 1.37 |
| 95 | 1.07 | 1.01 |
| 100 | 0.82 | 0.62 |

X represents the weight precent of the $A_n$ component that makes up the $A_n + B_n$ combination.

TABLE VII

| X | Peel Adhesion lb./in. | Green Strength MPa |
|---|---|---|
| 65 | 1.98 | 1.69 |
| 70 | 2.01 | 1.34 |
| 75 | 2.19 | 1.01 |
| 80 | 2.10 | 0.73 |
| 85 | 1.83 | 0.61 |
| 90 | 1.67 | 0.63 |
| 95 | 1.37 | 0.51 |
| 100 | 1.24 | 0.48 |

X represents the weight precent of the $A_n$ component that makes up the $A_n + B_n$ combination.

TABLE VIII

| X | Peel Adhesion lb./in. | Green Strength MPa |
|---|---|---|
| 87 | 1.53 | 1.43 |
| 90 | 1.60 | 1.07 |
| 95 | 1.31 | 0.97 |
| 100 | 1.12 | 0.51 |

X represents the weight precent of the $A_n$ component that makes up the $A_n + B_n$ combination.

TABLE IX

| X | Peel Adhesion lb./in. | Green Strength MPa |
|---|---|---|
| 70 | 1.52 | 1.59 |
| 75 | 1.49 | 1.39 |
| 80 | 1.46 | 1.11 |
| 85 | 1.41 | 0.89 |
| 90 | 1.39 | 0.76 |
| 95 | 1.22 | 0.53 |
| 100 | 1.24 | 0.48 |

X represents the weight precent of the $A_n$ component that makes up the $A_n + B_n$ combination.

TABLE X

| X | Peel Adhesion lb./in. | Green Strength MPa |
|---|---|---|
| 85 | 1.21 | 2.41 |
| 90 | 1.77 | 1.12 |
| 95 | 1.53 | 0.79 |
| 100 | 1.24 | 0.48 |

X represents the weight precent of the $A_n$ component that makes up the $A_n + B_n$ combination.

We claim:

1. A calendered article comprising an elastomeric polymer blend, said blend comprising:
   a) a first ethylene, α-olefin, non-conjugated bicyclic diene elastomeric polymer, wherein in said first elastomeric polymer;
   said ethylene is present in the range of from about 10 to about 63 weight percent and said non-conjugated bicyclic diene is present in the range of from about 0.1 to 10 weight percent, said weight percents based on the total weight percent of said first elastomeric polymer, wherein said first elastomeric polymer is present in said calendered article at a ratio of about 1.5:1 to about 9:1 with a second ethylene, α-olefin, non-conjugated bicyclic diene elastomeric polymer, said first elastomeric polymer has a crystallinity less than about 2.5 percent; and
   b) said second ethylene, α-olefin, non-conjugated bicyclic diene elastomeric polymer, comprising;
   said ethylene in the range of from about 65 to about 85 weight percent, said bicyclic non-conjugated diene in the range of from about 0.1 to about 10 weight percent, said weight percents based on the total weight of said second elastomeric polymer; said second elastomeric polymer has a crystallinity greater than about 3 percent, and wherein said first elastomeric polymer has a ML (1+4) 125° C. in the range of from about 20 to about 150 and wherein said second elastomeric polymer has a ML (1+4) 125° C. in the range of from about 100 to about 1000.

2. The calendered article of claim 1, wherein said first and said second elastomeric polymers contain a bicyclic non-conjugated diene selected from the group consisting of 5-ethylidene-2-norbornene, dicyclopentadiene, vinyl norbornene, and combinations thereof.

3. The calendered article of claim 2 wherein said non-conjugated bicyclic diene of said first and said second elastomeric polymers is different.

4. The calendered article of claim 2 wherein said non-conjugated bicyclic diene of said first and said second elastomeric polymers is the same.

5. The calendered article of claim 2 wherein in said first and said second elastomeric polymers, said alpha-olefin is selected from the group consisting of propylene, butene-1, 4-methyl-1-pentene, hexene-1, octene-1, decene-1 and combinations thereof and wherein said first elastomeric polymer has a crystallinity less than about 1.5 percent, and said second elastomeric polymer has a crystallinity greater than about 5 percent.

6. The calendered article of claim 2, wherein in said first and said second elastomeric polymers, said alpha-olefin is selected from the group consisting of propylene, hexene-1, and octene-1, wherein said non-conjugated bicyclic diene is 5-ethylidene-2-norbornene; and wherein said first elastomeric polymer has less than about 1 percent crystallinity; and said second elastomeric polymer has a crystallinity greater than about 7 percent.

7. The calendered article of claim 5 or 6 wherein said alpha-olefin in said first and said second elastomeric polymers is different.

8. The calendered article of claim 5 or 6 wherein said alpha-olefin in said first and said second elastomeric polymers is the same.

9. The calendered article of claim 6 wherein said first elastomeric polymer has a ML (1+4) 125° C. in the range of from about 20 to about 150 and wherein said second elastomeric polymer has a ML (1+4) 125° C. in the range of from about 100 to about 1000;

wherein said first and said second elastomeric polymers have about 93 percent of the molecules of a composition within about 2 percent of the ethylene content of the respective elastomeric polymer, and about 93 percent of the molecules of said first and said second elastomeric polymer have a non-conjugated bicyclic diene content within about 0.25 percent of the bicyclic content of the respective elastomeric polymer; and wherein said blend has a $M_w/M_n$ greater than about 2.0 to less than about 3.5.

10. The calendered article of claim 6 wherein:

said first elastomeric polymer is present in said blend in the range of from about 70 to about 85 percent based on the total weight of the elastomeric polymer blend;

said first elastomeric polymer includes said ethylene below about 67 weight percent and said non-conjugated bicyclic diene in the range of from about 0.5 to about 8 weight percent based on the total weight of said first elastomeric polymer, wherein said first elastomeric polymer has a ML (1+4) 125° C. in the range of from about 25 and about 125;

said second elastomeric polymer is present in said blend in the range of from about 15 to about 30 weight percent based on the total weight of said elastomeric polymer blend;

said second elastomeric polymer includes ethylene in the range of from about 70 to about 80 weight percent and said non-conjugated bicyclic diene in the range of from about 0.5 to about 8 weight percent based on the total weight of said second elastomeric polymer;

wherein said second elastomeric polymer has a ML (1+4) 125° C. in the range of from about 150 to about 800;

wherein about 95 percent of the molecules of said first and said second elastomeric polymer having a composition within 1.5 percent of the ethylene content of the respective elastomeric polymer, and about 97 percent of the molecules of said first and said second elastomeric polymers have composition within about 0.2 percent of the non-conjugated bicyclic content of the respective elastomeric polymer; and wherein said blend has a $M_w/M_n$ greater than about 2.0 to less than about 3.5.

11. The calendered article of claim 6 wherein;

said first elastomeric polymer is present in said blend in the range of from about 70 to about 80 weight percent based on the total weight of the blend;

said first elastomeric polymer comprises said ethylene below about 67 weight percent and said non-conjugated bicyclic diene in the range of from about 1 to about 5 weight percent, based on the total weight of said first elastomeric polymer, wherein said first elastomeric polymer has a ML (1+4) 125° C. in the range of from about 25 and about 70;

said second elastomeric polymer is present in said blend in the range of from about 15 to about 30 weight percent based on the total weight of said blend;

said second elastomeric polymer comprises ethylene in the range of from about 73 to about 77 weight percent and said non-conjugated bicyclic diene in the range of from about 1 to about 5 weight percent based on the total weight of said second elastomeric polymer;

wherein said second elastomeric polymer has a ML (1+4) 125° C. in the range of from about 200 to about 700;

wherein about 97 percent of the molecules of said first and said second elastomeric polymers have a composition within about 1 percent of the ethylene content of the respective elastomeric polymer, and about 97 percent of the molecules of said first and said second elastomeric polymers have composition within about 0.1 of the bicyclic content of the respective elastomeric polymer; and wherein said blend will have a $M_w/M_n$ greater than 2 and less than about 3.5.

12. A roofing article, comprising a blend of a first elastomeric polymer and a second elastomeric polymer;

a) wherein said first elastomeric polymer is present in said blend in the range of from about 70 to about 80 weight percent, based on the total weight of the blend;

b) wherein said first elastomeric polymer is an ethylene, propylene, 5-ethylidene-2-norbornene elastomeric polymer, having:
  i) ethylene present at less than about 62 weight percent; and
  ii) 5-ethylidene-2-norbornene present in the range of from about 2 to about 4 weight percent; said weight percents based on the total weight of said first elastomeric polymer;

c) wherein said first elastomeric polymer has an ML (1+4) at 125° C. in the range of from about 25 to about 70;

d) wherein said second elastomeric polymer is an ethylene, propylene, 5-ethylidene-2-norbornene elastomeric polymer having;
  i) ethylene present in the range of from about 73 to about 77 weight percent; and
  ii) 5-ethylidene-2-norbornene present in the range of from about 2 to about 4 weight percent; said weight percents based on the total weight of said second elastomeric polymer;

wherein said second elastomeric polymer has an ML (1+4) at 125° C. in the range of from about 200 to about 700;

wherein about 97 percent of molecules of said first and said second elastomeric polymers have a composition within about 1 percent of the bulk ethylene content of the respective elastomeric polymers;

wherein about 97 percent of molecules of said first and said second elastomeric polymers have a composition within about 0.1 percent of the 5-ethylidene-2-norbornene content of the respective elastomeric polymers; and wherein said first elastomeric polymer has crystallinity less than about 1 percent, said second elastomeric polymer has a crystallinity greater than about 7 percent;

wherein a compound including said blend has a green strength above about 2 MPa, and a peel adhesion above about 2 lb./in.

13. The roofing article of claim 12 wherein said compound has a green strength above about 2.4 MPa, and a peel adhesion above about 2 lb./in.

14. The roofing article of claim 12 wherein said compound has a green strength above about 2.5 MPa, and a peel adhesion above about 2.2 lb./in.

15. The roofing article of claim 12 wherein said compound has a green strength above about 2.6 MPa, and a peel adhesion above about 2.5 lb./in.

* * * * *